(12) United States Patent
Pereg et al.

(10) Patent No.: US 7,716,048 B2
(45) Date of Patent: May 11, 2010

(54) METHOD AND APPARATUS FOR SEGMENTATION OF AUDIO INTERACTIONS

(75) Inventors: Oren Pereg, Zikhron Ya'akov (IL); Moshe Waserblat, Modin (IL)

(73) Assignee: Nice Systems, Ltd., Raanana (IL)

( * ) Notice: Subject to any disclaimer, the term of this patent is extended or adjusted under 35 U.S.C. 154(b) by 1019 days.

(21) Appl. No.: 10/567,810

(22) PCT Filed: Jan. 25, 2006

(86) PCT No.: PCT/IL2006/000100

§ 371 (c)(1),
(2), (4) Date: Feb. 9, 2006

(87) PCT Pub. No.: WO2007/086042

PCT Pub. Date: Aug. 2, 2007

(65) Prior Publication Data

US 2008/0181417 A1 Jul. 31, 2008

(51) Int. Cl.
*G10L 15/00* (2006.01)
(52) U.S. Cl. .................. 704/246; 704/247; 704/248; 379/88.01
(58) Field of Classification Search ............. 704/246, 704/247, 248; 379/88.01
See application file for complete search history.

(56) References Cited

U.S. PATENT DOCUMENTS

| | | | |
|---|---|---|---|
| 4,104,539 A | 8/1978 | Hase | |
| 4,145,715 A | 3/1979 | Clever | |
| 4,359,679 A | 11/1982 | Regan | |
| 4,527,151 A | 7/1985 | Byrne | |
| 4,766,364 A | 8/1988 | Biamonte et al. | |
| 4,821,118 A | 4/1989 | Lafreniere | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,168 A | 10/1994 | Crick | |
| 5,404,170 A | 4/1995 | Keating | |
| 5,491,511 A | 2/1996 | Odle | |

(Continued)

FOREIGN PATENT DOCUMENTS

DE 103 58 333 A1 7/2005

(Continued)

OTHER PUBLICATIONS

SERTAINTY™ Automated Quality Monitoring; © 2003 SER Solutions, Inc. www.ser.com.

(Continued)

*Primary Examiner*—Daniel D Abebe
(74) *Attorney, Agent, or Firm*—Ohlandt, Greeley, Ruggiero & Perle, L.L.P.

(57) ABSTRACT

A method and apparatus for segmenting an audio interaction, by locating anchor segment from each side of the interaction, iteratively classifying additional segments into one of the two sides, and scoring the resulting segmentation, If the score result is below a threshold, the process is repeated until the segmentation score is satisfactory or until a stopping criterion is met. The anchoring and the scoring steps comprise using additional data associated with the interaction, a speaker thereof, internal or external information related to the interaction or to a speaker thereof or the like.

20 Claims, 3 Drawing Sheets

U.S. PATENT DOCUMENTS

| | | | |
|---|---|---|---|
| 5,519,446 A | 5/1996 | Lee | |
| 5,598,507 A * | 1/1997 | Kimber et al. | 704/246 |
| 5,655,058 A * | 8/1997 | Balasubramanian et al. | 704/255 |
| 5,659,662 A * | 8/1997 | Wilcox et al. | 704/245 |
| 5,734,441 A | 3/1998 | Kondo et al. | |
| 5,742,349 A | 4/1998 | Choi et al. | |
| 5,751,346 A | 5/1998 | Dozier et al. | |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook et al. | |
| 5,920,338 A | 7/1999 | Katz | |
| 6,014,647 A | 1/2000 | Nizzar et al. | |
| 6,028,626 A | 2/2000 | Aviv et al. | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seely et al. | |
| 6,111,610 A | 8/2000 | Faroudja | |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,236,582 B1 | 5/2001 | Jalaleddine | |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,405,166 B1 * | 6/2002 | Huang et al. | 704/246 |
| 6,421,645 B1 * | 7/2002 | Beigi et al. | 704/272 |
| 6,424,946 B1 * | 7/2002 | Tritschler et al. | 704/272 |
| 6,427,137 B2 | 7/2002 | Petrushin | |
| 6,441,734 B1 | 8/2002 | Gutta et al. | |
| 6,549,613 B1 | 4/2003 | Dikmen | |
| 6,559,769 B2 | 5/2003 | Anthony et al. | |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 7,076,427 B2 | 7/2006 | Scarano et al. | |
| 7,103,806 B1 | 9/2006 | Horvitz | |
| 7,295,970 B1 * | 11/2007 | Gorin et al. | 704/221 |
| 2001/0043697 A1 | 11/2001 | Cox et al. | |
| 2001/0052081 A1 | 12/2001 | McKibben et al. | |
| 2002/0005898 A1 | 1/2002 | Kawada et al. | |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2003/0033145 A1 | 2/2003 | Petrushin | |
| 2003/0059016 A1 | 3/2003 | Lieberman et al. | |
| 2003/0128099 A1 | 7/2003 | Cockerham | |
| 2003/0163360 A1 | 8/2003 | Galvin | |
| 2003/0182118 A1 * | 9/2003 | Obrador et al. | 704/246 |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0249650 A1 | 12/2004 | Freedman et al. | |
| 2004/0260550 A1 * | 12/2004 | Burges et al. | 704/259 |
| 2005/0228673 A1 * | 10/2005 | Nefian et al. | 704/270 |
| 2006/0093135 A1 | 5/2006 | Fiatal et al. | |
| 2006/0229876 A1 * | 10/2006 | Aaron et al. | 704/263 |

FOREIGN PATENT DOCUMENTS

| | | |
|---|---|---|
| EP | 1 484 892 A2 | 12/2004 |
| GB | 9916430.3 | 7/1999 |
| IL | 03 067884 A1 | 8/2003 |
| WO | WO 95 29470 A | 11/1995 |
| WO | WO 98 01838 A | 1/1998 |
| WO | WO 00/73996 | 12/2000 |
| WO | WO 02/37856 A1 | 5/2002 |
| WO | WO 03 013113 A2 | 2/2003 |
| WO | WO 03/067360 A2 | 8/2003 |
| WO | WO 03/067884 A1 | 8/2003 |
| WO | WO 2004/091250 A1 | 10/2004 |

OTHER PUBLICATIONS

SERTAINTY™ Agent Performance Optimization; © 2005 SER Solutions, Inc. www.ser.com.

Lawrence P. Mark; Sertainty™ Automated Quality Assurance; © 2003-2005 SER Solutions, Inc.

Reynolds, et al.; Robust Text-Independent Speaker Identification Using Gaussian Mixture Speaker Models; *IEEE Transactions on Speech and Audio Processing*, vol. 3, No. 1,pp. 72-83; Jan. 1995.

Chaudhari, et al.; Very Large Population Text-Independent Speaker Identification using Transformation Enhanced Multi-Grained Models; IBM T.J. Watson Research Center. Oct. 2000.

Reynolds, et al.; Speaker Verification Using Adapted Gaussian Mixture Models; M.I.T. Lincoln Laboratory; Digital Signal Processing 10, pp. 19-41 (Oct. 1, 2000).

Bimbot, et al.; A Tutorial on Text-Independent Speaker Vertification; *EURASIP Journal on Applied Signal Processing*; pp. 430-451; © 2004 Hindawi Publishing Corporation.

Muthusamy, et al.; Reviewing Automatic Language Identification; *IEEE Signal Processing Magazine*; pp. 33-41; Oct. 1994.

Zissman; Comparison of Four Approaches to Automatic Language Identification of Telephone Speech; *IEEE Transactions on Speech and Audio Processing*, vol. 4, No. 1, pp. 31-44; Jan. 1996.

Freedman, I. Closing the Contact Center Quality Loop with Customer Experience Management, Customer Interaction Solutions, vol. 19, No. 9, Mar. 2001.

PR Newswire, Nice Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from Information Week, http://www.informationweek.com/story/IWK20030223S0002.

(Hebrew) print from Haaretz, "The Computer at the Other End of the Line", Feb. 17, 2002.

* cited by examiner

METHOD AND APPARATUS FOR SEGMENTATION OF AUDIO INTERACTIONS

BACKGROUND OF THE INVENTION

1. Field of the Invention

The present invention relates to audio analysis in general and to a method and apparatus for segmenting an audio interaction, in particular.

2. Discussion of the Related Art

Audio analysis refers to the extraction of information and meaning from audio signals for purposes such as word statistics, trend analysis, quality assurance, and the like. Audio analysis could be performed in audio interaction-extensive working environments, such as for example call centers, financial institutions, health organizations, public safety organizations or the like. Typically, audio analysis is used in order to extract useful information associated with or embedded within captured or recorded audio signals carrying interactions. Audio interactions contain valuable information that can provide enterprises with insights into their business, users, customers, activities and the like. The extracted information can be used for issuing alerts, generating reports, sending feedback or otherwise using the extracted information. The information can be usefully manipulated and processed, such as being stored, retrieved, synthesized, combined with additional sources of information, and the like. Extracted information can include for example, continuous speech, spotted words, identified speaker, extracted emotional (positive or negative) segments within an interaction, data related to the call flow such as number of bursts in from each side, segments of mutual silence, or the like. The customer side of an interaction recorded in a commercial organization can be used for various purposes such as trend analysis, competitor analysis, emotion detection (finding emotional calls) to improve customer satisfaction level, and the like. The service provider side of such interactions can be used for purposes such as script adherence, emotion detection (finding emotional calls) to track deficient agent behavior, and the like. The most common interaction recording format is summed audio, which is the product of analog line recording, observation mode and legacy systems. A summed interaction may include, in addition to two or more speakers that at times may talk simultaneously (co-speakers), also music, tones, background noises on either side of the interaction, or the like. The audio analysis performance, as measured in terms of accuracy, detection, real-time efficiency and resource efficiency, depends directly on the quality and integrity of the captured and/or recorded signals carrying the audio interaction, on the availability and integrity of additional meta-information, on the capabilities of the computer programs that constitute the audio analysis process and on the available computing resources. Many of the analysis tasks are highly sensitive to the audio quality of the processed interactions. Multiple speakers, as well as music (which is often present on hold periods), tones, background noises such as street noise, ambient noise, convolutional noises such as channel type and handset type, keystrokes and the like, severely degrade the performance of these engines, sometimes to the degree of complete uselessness, for example in the case of emotion detection where it is mandatory to analyze only one speaker's speech segments. Therefore it is crucial to identify only the speech segments of an interaction wherein a single speaker is speaking. The customary solution is to use unsupervised speaker segmentation module as part of the audio analysis.

Traditionally, unsupervised speaker segmentation algorithms are based on bootstrap (bottom up) classification methods, starting with short discriminative segments and extending such segments using additional, not necessarily adjacent segments. Initially, a homogenous speaker segment is located, and regarded as an anchor. The anchored segment is used for initially creating a model of the first speaker. In the next phase a second homogenous speaker segment is located, in which the speaker characteristics are most different from the first segment. The second segment is used for creating a model of the second speaker. By deploying an iterative maximum-likelihood (ML) classifier, based on the anchored speaker models, all other utterance segments could be roughly classified. The conventional methods suffer from a few limitations: the performance of the speaker segmentation algorithm is highly sensitive to the initial phase, i.e., poor choice of the initial segment (anchored segment) can lead to unreliable segmentation results. Additionally, the methods do not provide a verification mechanism for assessing the success of the segmentation, nor the convergence of the methods, in order to eliminate poorly segmented interactions from being further processed by audio analysis tools and providing further inaccurate results. Another drawback is that additional sources of information, such as computer-telephony-integration (CTI) data, screen events and the like are not used. Yet another drawback is the inability of the method to tell which collection of segments belongs to one speaking side, such as the customer, and which belongs to the other speaking side, since different analyses are performed on both sides, to serve different needs.

It should be easily perceived by one with ordinary skills in the art, that there is an obvious need for an unsupervised segmentation method and for an apparatus to segment an unconstrained interaction into segments that should not be analyzed, such as music, tones, low quality segments or the like, and segments carrying speech of a single speaker, where segments of the same speaker should be grouped or marked accordingly. Additionally, identifying the sides of the interaction is required. The segmentation tool has to be effective, i.e., extract as long and as many as possible segments of the interaction in which a single speaker is speaking, with as little as possible compromise on the reliability, i.e., the quality of the segments. Additionally, the tool should be fast and efficient, so as not to introduce delays to further processing, or place additional burden on the computing resources of the organization. It is also required that the tool will provide a performance estimation which can be used in deciding whether the speech segments are to be sent for analysis or not.

SUMMARY OF THE PRESENT INVENTION

It is an object of the present invention to provide a novel method for speaker segmentation which overcomes the disadvantages of the prior art. In accordance with the present invention, there is thus provided a speaker segmentation method for associating one or more segments for each of two or more sides of one or more audio interactions, with one of the sides of the interaction using additional information, the method comprising: a segmentation step for associating the one or more segments with one side of the interaction, and a scoring step for assigning a score to said segmentation. The additional information can be one or more of the group consisting of: computer-telephony-integration information related to the at least one interaction; spotted words within the at least one interaction; data related to the at least one interaction; data related to a speaker thereof; external data related to the at least one interaction; or data related to at least one other interaction performed by a speaker of the at least one interaction. The method can further comprise a model association step for scoring the segments against one or more statistical models of one side, and obtaining a model association score. The scoring step can use discriminative information for discriminating the two or more sides of the interaction. The scoring step can comprise a model association step for scoring the segments against a statistical model of one side, and obtaining a model association score. Within the method, the scoring step can further comprise a normalization step for normalizing the one or more model scores. The scoring step can also comprise evaluating the association of the one or more segments with a side of the interaction, using additional information. The additional information can be one or more of the group consisting of: computer-telephony-integration information related to the at least one interaction; spotted words within the at least one interaction; data related to the at least one interaction; data related to a speaker thereof; external data related to the at least one interaction; or data related to at least one other interaction performed by a speaker of the at least one interaction. The scoring step can comprise statistical scoring. The method can further comprise: a step of comparing the score to a threshold; and repeating the segmentation step and the scoring step if the score is below the threshold. The threshold can be predetermined, or dynamic, or depend on: information associated with said at least one interaction, information associated with an at least one speaker thereof, or external information associated with the interaction. The segmentation step can comprise a parameterization step to transform the speech signal to a set of feature vectors in order to generate data more suitable for statistical modeling; an anchoring step for locating an anchor segment for each side of the interaction; and a modeling and classification step for associating at least one segment with one side of the interaction. The anchoring step or the modeling and classification step can comprise using additional data, wherein the additional data is one or more of the group consisting of: computer-telephony-integration information related to the at least one interaction; spotted words within the at least one interaction; data related to the at least one interaction; data related to a speaker thereof; external data related to the at least one interaction; or data related to at least one other interaction performed by a speaker of the at least one interaction. The method can comprise a preprocessing step for enhancing the quality of the interaction, or a speech/non-speech segmentation step for eliminating non-speech segments from the interaction. The segmentation step can comprise scoring the one or more segments with a voice model of a known speaker.

Another aspect of the disclosed invention relates to a speaker segmentation apparatus for associating one or more segments for each of at two or more speakers participating in one or more audio interactions, with a side of the interaction, using additional information, the apparatus comprising: a segmentation component for associating one or more segments within the interaction with one side of the interaction; and a scoring component for assigning a score to said segmentation. Within the apparatus the additional information can be of the group consisting of: computer-telephony-integration information related to the at least one interaction; spotted words within the at least one interaction; data related to the at least one interaction; data related to a speaker thereof; external data related to the interaction; or data related to one or more other interactions performed by a speaker of the interaction.

Yet another aspect of the disclosed invention relates to a quality management apparatus for interaction-rich environments, the apparatus comprising: a capturing or logging component for capturing or logging one or more audio interactions; a segmentation component for segmenting the interactions; and a playback component for playing one or more parts of the one or more audio interactions.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention overcomes the disadvantages of the prior art by providing a novel method and a system for locating segments within an audio interaction in which a single speaker is speaking, dividing the segments into two or more groups, wherein the speaker in each segment group is the same one, and discriminating in which group of segments a certain participant, or a certain type of participant, such as a service representative (agent) of an organization, is speaking, and in which group another participant or participant type, such as a customer, is speaking. The disclosed invention utilizes additional types of data collected in interaction-intensive environments, such as call centers, financial institutions or the like, in addition to captured or recorded audio interactions in order to enhance the segmentation and the association of a group of segments with a specific speaker or speaker type, such as an agent, a customer or the like. The discussion below is oriented more to applications involving commerce or service, but the method is applicable to any required domain, including public safety, financial organizations such as trade floors, health organizations and others.

The information includes raw information, such as meta data, as well as information extracted by processing the interactions. Raw information includes, for example Computer Telephony Integration (CTI) information which includes hold periods, number called, number called, DNIS, VDN, ANI or the like, agent details, screen events related to the current or other interactions with the customer, information exchanged between the parties, and other relevant information that can be retrieved form external sources such as CRM data, billing information, workflow management, mail messages and the like. The extracted information can include, for example certain words spotted within the interaction, such as greetings, compliance phrases or the like, continuous speech recognition, emotion detected within an interaction, and call flow information, such as bursts of one speaker when the other speaker is talking, mutual silence periods and others. Other data used, include for example voice models of a single or multiple speakers.

The collected data is used in the process of segmenting the audio interaction in a number of ways. First, the information can be used to obtain an accurate anchor point for the initial selection of a segment of a single speaker. For example, a segment in which a compliance phrase was spotted can be a good anchor point for one speaker, specifically the agent. A highly emotional segment can be used as an anchor for the customer side. Such information can be used during the classification of segments into speakers, and also for posteriori assessment of the performance of the segmentation. Second, the absence or presence, and certainty level of specific events within the segments of a certain speaker can contribute to the discrimination of the agent side from the customer side, and also for assessing the performance of the segmentation. For example, the presence of compliance sentences and typical customer-side noises (such as a barking dog) in segments of allegedly the same speaker, can suggest a deficient segmentation. The discrimination of the speakers can be enhanced by utilizing agent-customer-discriminating information, such as screen events, emotion levels, and voice models of a specific agent, a specific customer, a group of agents, a universal agent model or a universal customer model. If segments attributed to one side have a high probability of complying with a specific agent's characteristics or with a universal agent model, relating the segments to the agent side will have a higher score, and vice versa. Thus, the segmentation can be assessed, and according to the assessment result accepted, rejected, or repeated.

Figure 1:
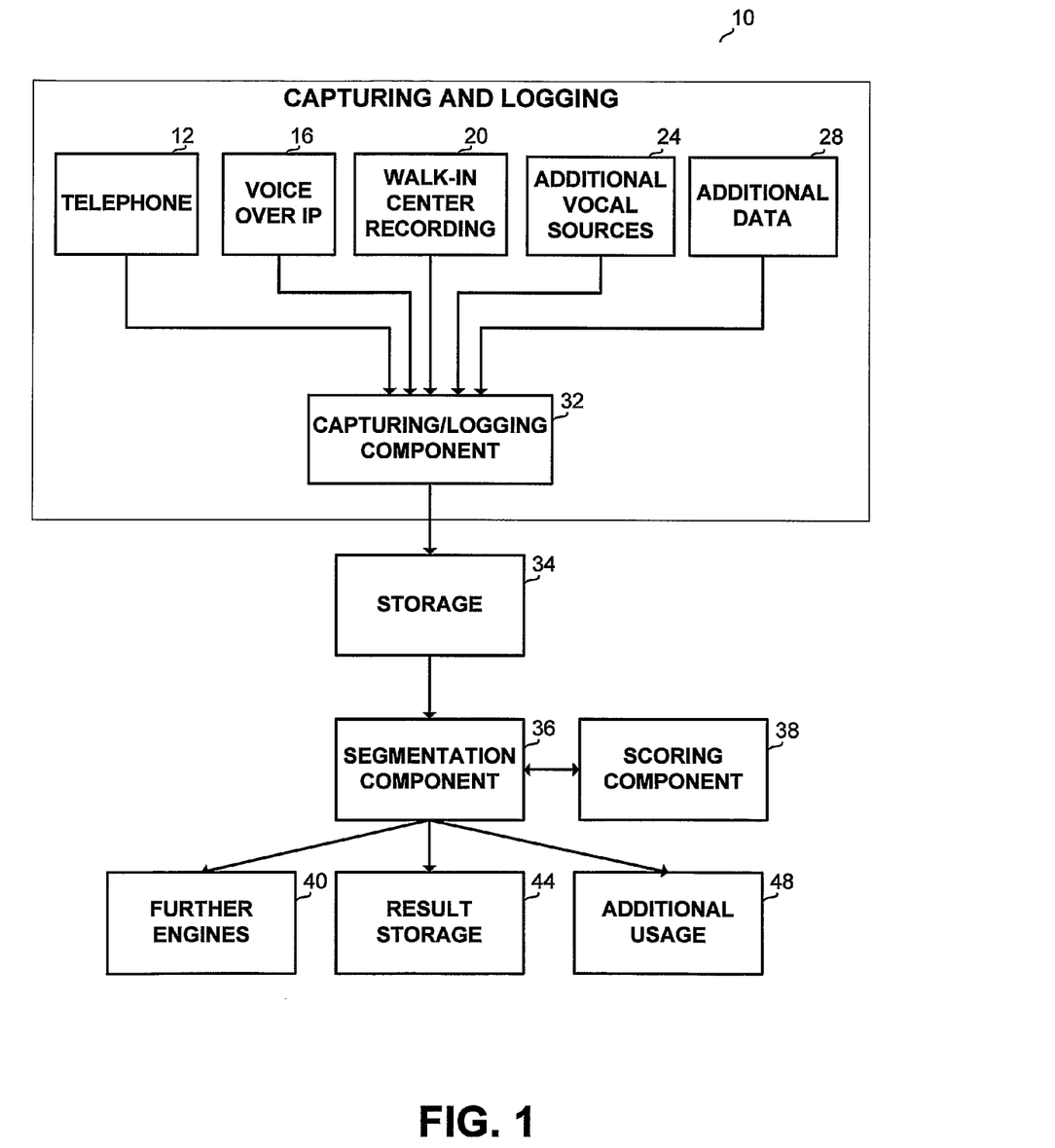
FIG. 1 is a schematic block diagram of a typical environment in which the disclosed invention is used, in accordance with a preferred embodiment of the present invention.

Referring now to FIG. 1, which presents a block diagram of the main components in a typical environment in which the disclosed invention is used. The environment, generally referenced as 10, is an interaction-rich organization, typically a call center, a bank, a trading floor, another financial institute, a public safety contact center, or the like. Customers, users or other contacts are contacting the center, thus generating input information of various types. The information types include vocal interactions, non-vocal interactions and additional data. The capturing of voice interactions can employ many forms and technologies, including trunk side, extension side, summed audio, separate audio, various encoding and decoding protocols such as G729, G726, G723.1, and the like. The vocal interactions usually include telephone 12, which is currently the main channel for communicating with users in many organizations. The voice typically passes through a PABX (not shown), which in addition to the voice of the two or more sides participating in the interaction collects additional information discussed below. A typical environment can further comprise voice over IP channels 16, which possibly pass through a voice over IP server (not shown). The interactions can further include face-to-face interactions, such as those recorded in a walk-in-center 20, and additional sources of vocal data 24, such as microphone, intercom, the audio of video capturing, vocal input by external systems or any other source. In addition, the environment comprises additional non-vocal data of various types 28. For example, Computer Telephony Integration (CTI) used in capturing the telephone calls, can track and provide data such as number and length of hold periods, transfer events, number called, number called from, DNIS, VDN, ANI, or the like. Additional data can arrive from external sources such as billing, CRM, or screen events, including text entered by a call representative, documents and the like. The data can include links to additional interactions in which one of the speakers in the current interaction participated. Another type of data includes data extracted from vocal interactions, such as spotted words, emotion level, speech-to-text or the like. Data from all the above-mentioned sources and others is captured and preferably logged by capturing/logging unit 32. The captured data is stored in storage 34, comprising one or more magnetic tape, a magnetic disc, an optical disc, a laser disc, a mass-storage device, or the like. The storage can be common or separate for different types of captured interactions and different types of additional data. Alternatively, the storage can be remote from the site of capturing and can serve one or more sites of a multi-site organization such as a bank. Capturing/logging unit 32 comprises a computing platform running one or more computer applications as is detailed below. From capturing/logging unit 32, the vocal data and preferably the additional relevant data is transferred to segmentation component 36 which executes the actual segmentation of the audio interaction. Segmentation component 36 transfers the output segmentation to scoring component 38, which assigns a score to the segmentation. If the score exceeds a certain threshold, the segmentation is accepted. If the score is below the threshold, another activation of the segmentation is attempted. The scoring and segmentation sequence is repeated until an acceptable score is achieved, or a stopping criterion is met. The threshold can be predetermined, or it can be set dynamically, taking into account the interaction type, one or more of the speakers if known, additional data such as Computer-Telephony-Integration (CTI) data, CRM, or billing data, data associated with any of the speakers, screen events or the like. For example, the system can assign a higher threshold to an interaction of a VIP customer, than to an interaction of an ordinary customer, or higher threshold for interactions involving opening an account or the like. It is obvious that if the audio content of interactions, or some of the interactions, is recorded as summed, then speaker segmentation has to be performed. However, even when the audio interactions are recorded separately for each side, as is usually the case in trunk-side or digital extension recording, there still is segmentation work to be done. Separating speech from non-speech is required in order to obtain fluent speech segments, by excluding segment of music, tones, significant background noise, low quality or the like. In addition, there might still be effects of echo, background speech on the either side, the customer consulting a third person, or the like, which require the segmentation and association of single-speaker segments with one speaker. The segmented audio can assume the form of separate audio streams or files for each side, the form of the original stream or file accompanied by indexing information denoting the beginning and end of each segment in which a certain side of the interaction is speaking, or any other form. The segmented audio is preferably transferred to further engines 40, such as speech-to-ext engine, emotion detection, speaker recognition, or other voice processing engines. Alternatively, the segmentation information or the segmented voice is transferred for storage purposes 44. In addition, the information can be transferred to any other purpose or component 48, such as, but not limited to a playback component for playing the captured or segmented audio interactions. All components of the system, including capturing/logging components 32 and segmentation component 36, preferably comprise one or more computing platforms, such as a personal computer, a mainframe computer, or any other type of computing platform that is provisioned with a memory device (not shown), a CPU or microprocessor device, and several I/O ports (not shown). Alternatively, each component can be a DSP chip, an ASIC device storing the commands and data necessary to execute the methods of the present invention, or the like. Each component can further include a storage device (not shown), storing the relevant applications and data required for processing. Each application running on each computing platform, such as the capturing applications or the segmentation application is a set of logically inter-related computer programs or modules and associated data structures that interact to perform one or more specific tasks. All applications can be co-located and run on the same one or more computing platform, or on different platforms. In yet another alternative, the information sources and capturing platforms can be located on each site of a multi-site organization, and one or more segmentation components can be remotely located, segment interactions captured at one or more sites and store the segmentation results in a local, central, distributed or any other storage.

Figure 2:
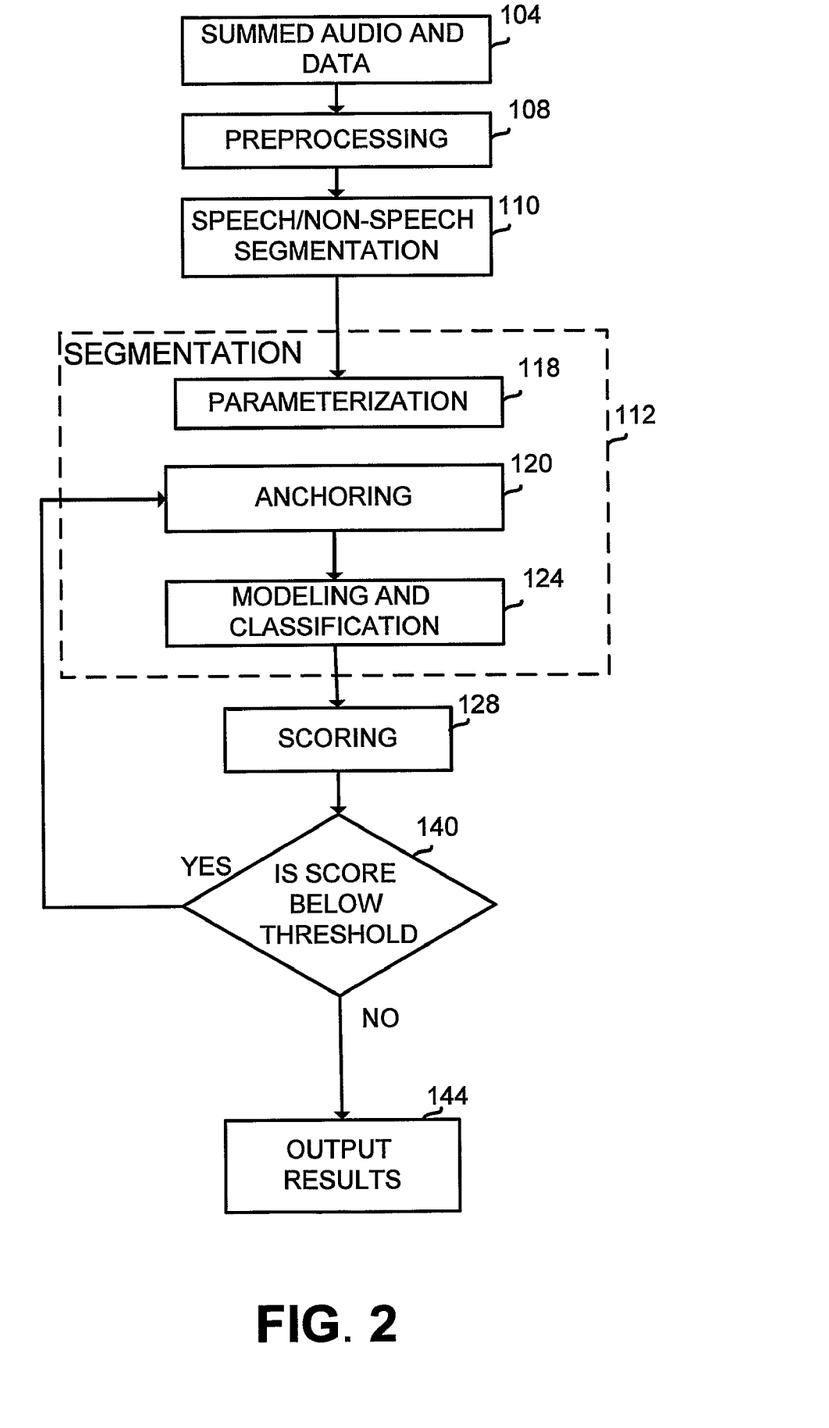
FIG. 2 is a schematic flowchart of the disclosed segmentation method, in accordance with a preferred embodiment of the present invention.

Referring now to FIG. 2 showing a flowchart of the main steps in the proposed speaker segmentation method. Summed audio as well as additional data, such as CTI data, screen events, spotted words, data from external sources such as CRM, billing, or the like are introduced at step 104 to the system. The summed audio can use any format and any compression method acceptable by the system, such as PCM, WAV, MP3, G729, G726, G723.1, or the like. The audio can be introduced in streams, files, or the like. At step 108, preprocessing is performed on the audio, in order to enhance the audio for further processing. The preprocessing preferably includes decompression, according to the compression used in the specific interaction. If the audio is from an external source, the preprocessing can include compression and decompression with one of the protocols used in the environment in order to adapt the audio to the characteristics common in the environment. The preprocessing can further include low-quality segments removal or other processing that will enhance the quality of the audio. Step 110 marks, removes or otherwise eliminates non-speech segments from the audio. Such segments can include music, tones, DMFT, silence, segments with significant background noise or other substantially non-speech segments. Preprocessing step 108 and speech/non-speech segmentation step 110 are optional, and can be dispensed with. However, the performance in time, computing resources and the quality of the speaker segmentation will degrade if step 108 or step 110 are omitted. The enhanced audio is then transferred to segmentation step 112. Segmentation step 112 comprises a parameterization step 118, an anchoring step 120 and a modeling and classification step 124. At step 118 the speech is being parameterized by transforming the speech signal into a set of feature vectors. The purpose of this transformation is to obtain a new representation which is more compact, less redundant and more suitable for statistical modeling. Most of the speaker segmentation systems depend on cepstral representation of speech in addition to prosodic parameters such as pitch, pitch variance, energy level and the like. The parameterization generates a sequence of feature vectors, wherein each vector relates to a certain time frame, preferably in the range of 10-30 ms, where the speech could be regarded as stationary. In another alternative method, the parameterization step is performed earlier as part of preprocessing step 108 or speech/non-speech segmentation step 110. At step 118 the speech signal is being divided into non-overlapping segments, typically but not limited to having a period of 1-3 seconds. The speaker segmentation main process starts at step 120, during which, anchor segments are located within the audio interaction. Preferably, the method searches for two segments to be used as anchor segments and each of the two segments should contain speech of a different speaker. Each anchor segment will be used for initial voice modeling of the speaker it represents. The first anchor segment finding is preferably performed by a statistical modeling of every segment in the interaction and then by locating the most homogenous segment in terms of statistical voice feature distribution. Such segment is more likely to be a segment in which a single speaker is speaking rather than an area of transition between two speakers. This segment will be used for first speaker initial voice model building. Locating such first segment can also involve utilizing additional data, such as CTI events, for example the first speaker in a call center interaction is likely to be the agent addressing the customer. Alternatively, spotting with high certainty standard phrases which agents are instructed to use, such as "company X good morning, how can I help you", can help identify an anchor segment for the agent side, and standard questions, such as "how much would it cost to", can help in locating homogenous segments of a customer side. Once the first anchor segment is determined, the method constructs a statistical model of the voice features in that segment where the statistical model represents the voice characteristics of the first speaker. Subsequently, the method searches for a second anchor segment, whose statistical model is as different as possible from the statistical model of the first anchor, the distance is measured and quantified by some statistical distance function, such as a likelihood ratio test. The aim of the second anchor finding is to find an area in the interaction which is most likely produced by a different statistical source, i.e. a different speaker. Alternatively, if the agent (or the customer) is known and a voice model of the agent has previously been built using other voice samples of the speaker or can be otherwise obtained, locating the segments of the agent can be done by searching for all segments which comply with the specific agent model, and continuing by associating all the rest of the speech segment with the customer (or agent) side. Once the two anchor segments are determined, the system goes into the modeling and classification step 124. Step 124 comprises an iterative process. On each iteration, a statistical model is constructed from the aggregated segments identified so far as belonging to each speaker. Then the distance between each segment in the interaction and the speakers voice models is measured and quantified. The distance can be produced by likelihood calculation or the like. Next, one or more segments which are most likely to come from the same statistical distributions as the speakers statistical models, i.e. produced by the same speaker, are added to the similar speaker's pool of segments from the previous iteration. On the next iteration, the statistical models are reconstructed, utilizing the newly added segments as well as the previous ones, and new segments to be added are searched for. The iterations proceed until one or more stopping criteria are met, such as the distance between the model and the most similar segment exceeding a certain threshold, the length of the added segments being below a certain threshold or the like. During modeling and classification step 124, soft classification techniques can also be applied in determining the similarity between a segment and a statistical model or when calculating if a stop criterion is met. Once the modeling and classification is done, scoring step 128 takes place. Scoring step 128 assigns a score to the segmentation result. If the score is below a predetermined threshold, the performance is unsatisfactory and the process repeats, restarting from step 120, excluding the former first and second anchor segments or from step 118 using different voice features. The threshold can be predetermined, or it can be set dynamically, taking into account the interaction type, other data related to the interaction, additional data such as CTI data, external data such as CRM or billing data, data associated with any of the speakers, screen events or the like. The stopping condition for the segmentation can be defined in a predetermined manner, such as "try at most X times, and if the segmentation does not succeed, skip the interaction and segment another one". Alternatively, the stopping criteria can be defined dynamically, for example, "continue the segmentation as long as there are still segments that no segments X or less seconds apart from them, have been used as anchor segments". If the segmentation score exceeds the predetermined threshold, the results are output at step 144. The Scoring process is detailed in association with FIG. 3 below. The results output at step 144 can take any required form. One preferred form is a file or stream containing text, denoting the start and end locations of each segment, for example in terms of time units from the beginning of the interaction, and the associated speaker. The output can also comprise start and end locations for segments of an unknown speaker, or for non-speech segments. Another preferred form comprises two or more files wherein each file comprises the segments of one speaker. The non-speech or unknown speaker segments can be ignored or reside in a separate file for purposes such as playback.

Figure 3:
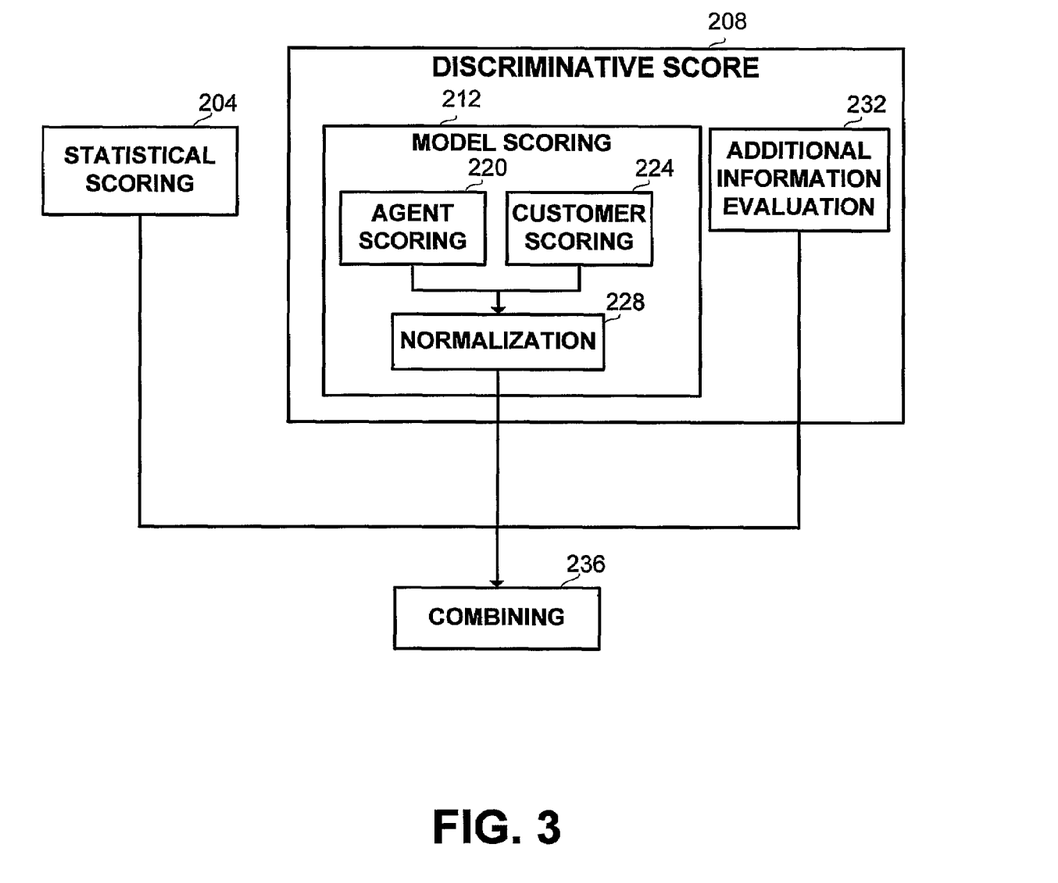
FIG. 3 is a schematic flowchart of the scoring process, in accordance with a preferred embodiment of the present invention.

Referring now to FIG. 3 showing the main steps in the scoring assessment process referred to in step 140 of FIG. 2. The scoring step comprises two main parts, assessing a statistical score and an agent-customer discrimination score. The statistical score determined at step 204 is based on determining the distance between the model generated from the segments attributed to one side and the model generated from the segments attributed to the other side. If the distance between the models is above a predetermined threshold, then the segments attributed to one side are significantly different than the segments attributed to the other side, and the classification is considered successful. If the distance is below a predetermined threshold (not necessarily equal to the predetermined threshold mentioned above), the segments attributed to different speakers are not distinctive enough, and the classification is assumed to be unsuccessful. However, the statistical score can be problematic, since the model-distance determination is calculated using the same tools and principles used when assigning segments to a certain speaker during the classification step. Therefore, the segmentation step and the testing step use the same data and the same calculations, which makes the examination biased and less reliable. Discriminative scoring step 208 uses discriminative information, such as discriminative customer-agent information in order to assess the success of the speaker segmentation process, and to determine or verify the association of each segment group with a specific speaker. Discriminative scoring step 208 is divided into model association step 212 and additional information scoring step 216. Model association step 212 uses previously built or otherwise acquired universal models of agents and of customers. The universal agent model is built from speech segments in which multiple agents of the relevant environment are speaking, using the same types of equipment used in the environment. The universal customer model is built from multiple segments of customers using various types of equipment, including land lines, cellular lines, various handsets, various types of typical customer background noise and the like. The model preferably incorporates both male and female customers if customers of both genders are likely to speak in real interactions, customers of relevant ages, accents and the like. If the speaker segmentation includes side (agent/customer) association, step 212 is used for verification of the association; otherwise step 212 is used for associating each segment group with a specific side. In model association step 212, the speech segments attributed to each side are preferably scored against the universal agent model in step 220, and against the universal customer model in step 224, thus obtaining two model association scores. The two model association scores are normalized in normalization step 228. If one segment group was assigned, for example, to an agent, and indeed the normalized score against the universal agent model yielded a significantly higher score than the scoring against the universal customer model, the association of the segment group to the agent side is reinforced. However, if the score of agent-assumed segment group against a customer model is higher then the score against the genera agent model, this might indicate a problem either in the segmentation or in the side association. The scoring can be performed for the segments attributed to a certain side one or more at a time, or all of them together, using a combination of the feature vectors associated with the segments. If the segment group is not assigned to a specific side, a normalized score to one side which exceeds a certain threshold can be used in determining the side as well as the quality of the segmentation. Model association step 212 can be performed solely in order to associate a segment group with a certain side, and not just to assess a segmentation quality, in which case it is not part of discriminative score 208 but rather an independent step.

In step 232 the method further uses additional data evaluation, in order to evaluate the contribution of each segment attributed to a certain speaker. Additional data can include spotted words that are typical to a certain side, such as "how can I help you" on the agent side, and "how much would that cost" for a customer side, CTI events, screen events, external or internal information or the like. The presence, possibly associated with a certainty level, of such events on segments associated with a specific side are accumulated or otherwise combined into a single additional data score. The scores of statistical scoring 204, model association 212 and additional data scoring 232 are combined at step 236, and a general score is issued. If the score is below a predetermined threshold, as is evaluate at step 140 of FIG. 2, the segmentation process restarts at step 120 excluding the former first and second anchor segments. Since none of scoring steps 204, 212, and 232 is mandatory, combining step 236 weights whatever scores that are available. Each subset of the scoring results of scoring steps 204, 212 and 232 can be used to produce a general scoring result. Combining step 236 can be further designed to weight additional scores, such as user input or other scoring mechanisms currently known or that will become known at a later time. Combining step 236 can use dynamic or predetermined parameters and schemes to weight or otherwise combine the available scores.

As mentioned above in relation to the statistical model scoring, and is applicable for all types of data, the same data item should not be used in the scoring phase if it was already used during the segmentation phase. Using the same data item in the two phases will bias the results and give higher and unjustified score to certain segmentation. For example, if the phrase "Company X good morning" was spotted at a certain location, and the segment it appeared on was used as an anchor for the agent side, considering this word during additional data scoring step will raise the score in an artificial manner, since it is known that the segment the phrase was said in is associated with the agent side.

It will be appreciated by people skilled in the art that some of the presented methods and scorings can be partitioned in a different manner over the described steps without significant change in the results. It will also be appreciated by people skilled in the art that additional scoring methods can exist and be applied in addition, or instead of the presented scoring. The scoring method can be applied to the results of any segmentation method, and not necessarily the one presented above. Also, different variations can be applied to the segmentation and the scoring methods as described, without significant change to the proposed solution. It will further be appreciated by people skilled in the art that the disclosed invention can be extended to segmenting an interaction between more than two speakers, without significant changes to the described method. The described rules and parameters, such as the acceptable score values, stopping criteria for the segmentation and the like can be predetermined or set dynamically. For example, the parameters can tale into account the type or length of the interaction, the customer type as received from an external system or the like.

The disclosed invention provides a novel approach to segmenting an audio interaction into segments, and associating each group of segments with one speaker. The disclosed invention provides a scoring and control mechanism over the quality of the resulting segmentation. The system It will be appreciated by persons skilled in the art that the present invention is not limited to what has been particularly shown and described hereinabove. Rather the scope of the present invention is defined only by the claims which follow.

What is claimed is:

1. A speaker segmentation method for associating an at least one segment of speech for each of at least two sides of a summed audio interaction, with one of the at least two sides of the interaction, using additional information, the method comprising:
   a receiving step for receiving the summed audio interaction from a capturing and logging unit;
   a segmentation step for associating the at least one segment with one side of the summed audio interaction, the segmentation step comprising
      a parameterization step for transforming a speech signal into a set of feature vectors and dividing the set into non-overlapping segments;
      an anchoring step for locating an anchor segment for each of the at least two sides of the summed audio interaction, the anchoring step comprising:
         selecting a homogenous segment as a first anchor segment;
         constructing a first model of the homogenous segment; and
         selecting a second anchor segment such that its model is different from the first model; and
      a modeling and classification step for associating at least one second segment with each side of the summed audio interaction; and
   a scoring step for assigning a score to said segmentation.

2. The method of claim 1 wherein the additional information is at least one item selected from the group consisting of: computer-telephony-integration information related to the summed audio interaction; spotted words within the summed audio interaction; data related to the summed audio interaction; data related to a speaker thereof; external data related to the summed audio interaction; and data related to at least one other interaction performed by a speaker of the summed audio interaction.

3. The method of claim 1 further comprising a model association step for scoring the at least one segment against an at least one statistical model of one side, and obtaining a model association score.

4. The method of claim 1 wherein the scoring step uses discriminative information for discriminating the at least two sides of the summed audio interaction.

5. The method of claim 4 wherein the scoring step comprises a model association step for scoring the at least one segment against an at least one statistical model of one side, and obtaining a model association score.

6. The method of claim 5 wherein the scoring step further comprises a normalization step for normalizing the at least one model score.

7. The method of claim 4 wherein the scoring step comprises evaluating the association of the at least one segment with a side of the summed audio interaction using second additional information.

8. The method of claim 7 wherein the second additional information is at least one item selected from of the group consisting of: computer-telephony-integration information related to the summed audio interaction; spotted words within the summed audio interaction; data related to the summed audio interaction; data related to a speaker thereof; external data related to the summed audio interaction; and data related to at least one other interaction performed by a speaker of the summed audio interaction.

9. The method of claim 1 wherein the scoring step comprises statistical scoring.

10. The method of claim 1 further comprising:
    a step of comparing said score to a threshold; and
    repeating the segmentation step and the scoring step if said score is below the threshold.

11. The method of claim 10 wherein the threshold is predetermined, or dynamic, or depends on: information associated with said summed audio interaction, information associated with an at least one speaker thereof or external information associated with the summed audio interaction.

12. The method of claim 1 wherein the homogenous segment is selected by spotting a predetermined phrase.

13. The method of claim 1 wherein the anchoring step or the modeling and classification step comprise using second additional data.

14. The method of claim 13 wherein the second additional data is at least one item selected from the group consisting of: computer-telephony-integration information related to the summed audio interaction; spotted words within the summed audio interaction; data related to the summed audio interaction; data related to a speaker thereof; external data related to the summed audio interaction; and data related to at least one other interaction performed by a speaker of the summed audio interaction.

15. The method of claim 1 further comprising a preprocessing step for enhancing the quality of the summed audio interaction.

16. The method of claim 1 further comprising a speech/non-speech segmentation step for eliminating non-speech segments from the summed audio interaction.

17. The method of claim 1 wherein the segmentation step comprises scoring the at least one segment with a voice model of a known speaker.

18. A speaker segmentation apparatus for associating an at least one segment of speech for each of at least two speakers participating in an audio interaction, with a side of the interaction, using additional information, the apparatus comprising:
    a segmentation component for associating an at least one segment within the audio interaction with one side of the audio interaction, the segmentation component comprising:
       a parameterization component for transforming a speech signal into a set of feature vectors and dividing the set into non-overlapping segments;
       an anchoring component for locating an anchor segment for each of the at least two sides of the audio interaction, the anchoring component selecting a homogenous segment as a first anchor segment, and a second anchor segment having a statistical model different from a statistical model associated with the first anchor segment; and
       a modeling and classification component for associating at least one second segment with each side of the audio interaction; and
    a scoring component for assigning a score to said segmentation.

19. The apparatus of claim 18 wherein the additional information is at least one item selected from the group consisting of: computer-telephony-integration information related to the audio interaction; spotted words within the audio interaction; data related to the audio interaction; data related to a speaker thereof; external data related to the audio interaction; and data related to at least one other interaction performed by a speaker of the audio interaction.

20. A quality management apparatus for interaction-rich speech environments, the apparatus comprising:

a capturing or logging component for capturing or logging an at least one audio interaction in which at least two sides communicate;

a segmentation component for segmenting the at least one audio interaction, the segmentation component comprising:

a parameterization component for transforming a speech signal into a set of feature vectors and dividing the set into non-overlapping segments;

an anchoring component for locating an anchor segment for each of the at least two sides of the at least one audio interaction, the anchoring component selecting a homogenous segment as a first anchor segment, and a second anchor segment having a statistical model different from a statistical model associated with the first anchor segment; and a modeling and classification component for associating at least one second segment with each side of the at least one audio interaction; and a playback component for playing an at least one part of the at least one audio interaction.

* * * * *